United States Patent
Henry

(10) Patent No.: US 6,324,863 B1
(45) Date of Patent: Dec. 4, 2001

(54) SANITARY ICE MAKING SYSTEM

(75) Inventor: Paul J. Henry, Andover, MN (US)

(73) Assignee: IMI Cornelius Inc., Anoka, MN (US)

( * ) Notice: Subject to any disclaimer, the term of this patent is extended or adjusted under 35 U.S.C. 154(b) by 0 days.

(21) Appl. No.: 09/519,500

(22) Filed: Mar. 6, 2000

Related U.S. Application Data

(60) Provisional application No. 60/122,935, filed on Mar. 5, 1999.

(51) Int. Cl.[7] .................................................. F25C 1/00
(52) U.S. Cl. ................................................. 62/347; 62/78
(58) Field of Search ............................... 62/74, 78, 347; 210/192, 748; 422/28, 37, 292, 24

(56) References Cited

U.S. PATENT DOCUMENTS

| | | | |
|---|---|---|---|
| 4,361,471 | * 11/1982 | Kosarek | 204/128 |
| 5,005,364 | * 4/1991 | Nelson | 62/76 |
| 5,458,851 | * 10/1995 | Schroeder et al. | 422/28 |
| 5,586,439 | * 12/1996 | Schlosser et al. | 62/78 |
| 5,798,036 | * 8/1998 | Zimmerman et al. | 205/620 |
| 6,045,704 | * 4/2000 | Sato et al. | 210/694 |
| 6,095,205 | * 8/2000 | Nagasawa | 141/89 |

* cited by examiner

Primary Examiner—William E. Tapolcai
Assistant Examiner—Mohammad M. Ali
(74) Attorney, Agent, or Firm—Sten Erik Hakanson

(57) ABSTRACT

The present invention is an apparatus and method for providing effective chlorination of water used in ice making equipment for the production of ice cubes for sanitizing and retarding the growth of micro-organisms therein. A chlorine generator is used to produce chlorine gas from chloride ions present in the water.

2 Claims, 3 Drawing Sheets

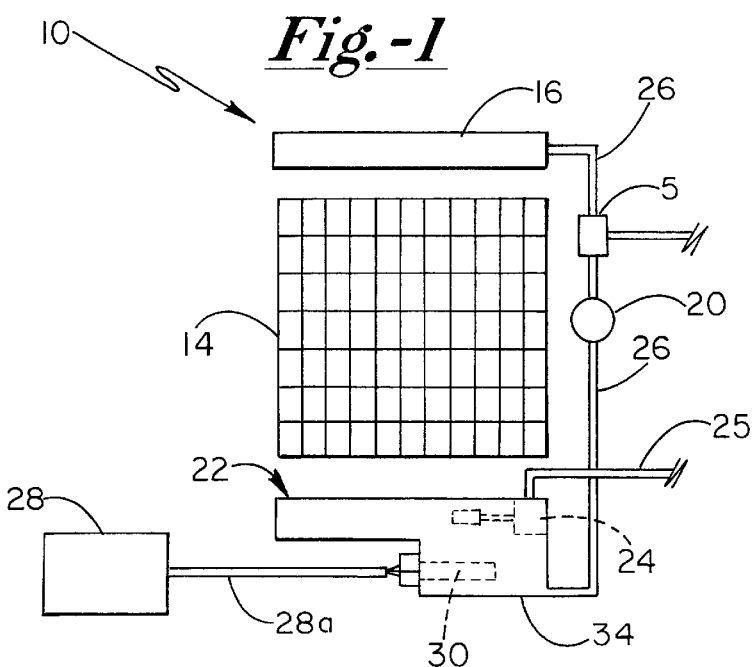
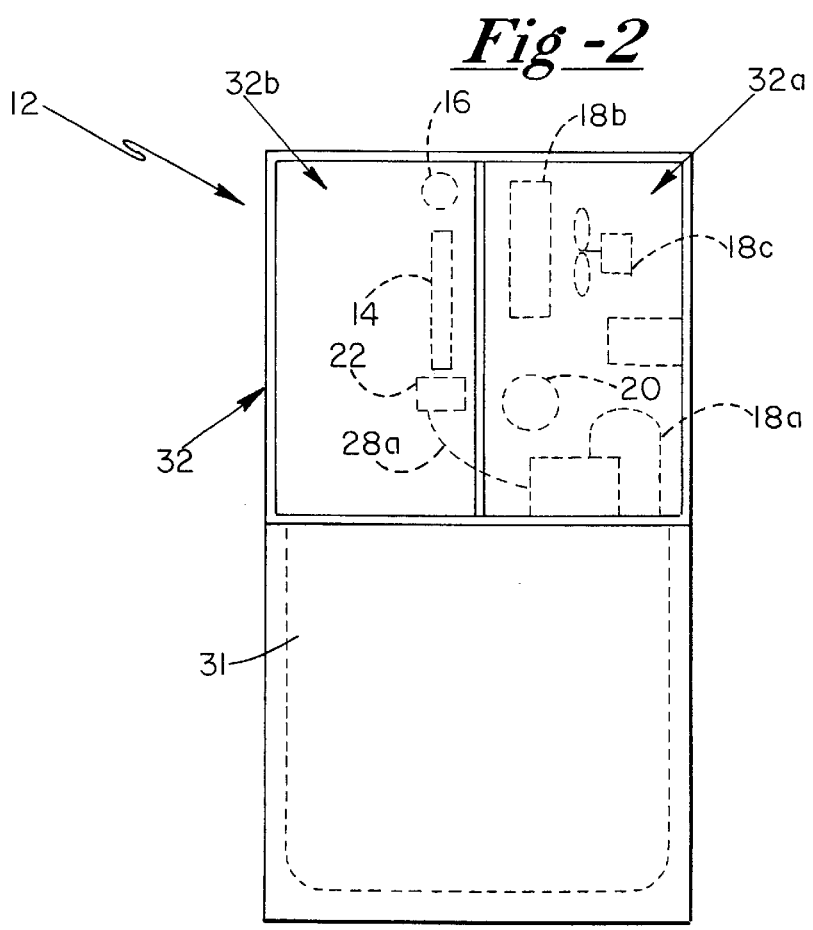

SANITARY ICE MAKING SYSTEM

This Application claims benefit to Provisional Application No. 60/122,935 filed Mar. 5, 1999.

FIELD OF THE INVENTION

The present invention relates generally t o methods and apparatus for maintaining a sanitary condition in an ice maker, and in particular to such methods and apparatus using the generation of chlorine as a sanitizing a gent.

BACKGROUND OF THE INVENTION

The need to keep ice making and dispensing equipment clean over time is well known in the art. It is understood that such equipment can become contaminated with microorganisms, such as, bacteria, yeast, fungi, and mold. Thus, for example, the ice forming evaporator, fluid lines and ice storage area found in such equipment must be periodically cleaned.

Manual cleaning with detergents and sterilizing chemicals can be effective, however, cleaning schedules are not, as a practical matter, always adhered to. In addition, the job may not be done satisfactorily in terms of a thorough cleaning and rinsing of the food contact and drain elements or tubes. Thus, systems have been developed including electronic controls that, in the case of an ice maker, automatically enter the machine into a sanitizing cycle wherein cleaning agents are pumped there through and subsequently rinsed off. Of course, the automatic systems can fail as well, where, for example, the cleaning agent reservoir runs out of cleaner, or the apparatus simply breaks down or fails to operate properly. Accordingly, a more reliable low cost method of maintaining an ice maker in a sufficiently sanitary condition that is less susceptible to human error or mechanical break down would be desirable.

SUMMARY OF THE INVENTION

The present invention is an apparatus and method for providing effective chlorination of water used in ice making equipment for the production of ice cubes for sanitizing and retarding the growth of micro-organisms therein.

As is known, an ice maker typically includes refrigeration components including a compressor, a condenser for cooling an evaporator. The evaporator is integral with an ice forming grid having the individual pockets in which the ice cubes are formed. As is also known in the art, the ice maker ,as above described, includes a water pump that operates to pump water from a source thereof to a water distribution tube located along and above the ice forming grid. The water then exits the distribution tube and cascades over the surface of the vertically oriented grid/evaporator. As the ice forming grid is cooled by contact with the evaporator during operation of the refrigeration system, some of the water flowing there over will freeze thereon. The remainder of the water will flow into a receiving tank to be recycled by the pump to flow repeatedly over the evaporator until ice of a sufficient thickness is formed thereon. The ice is then harvested, typically by hot gas defrosting of the evaporator, causing the ice to melt slightly and slip off the grid structure and drop into an ice retaining bin there below.

An electronic chlorine generating device, as manufactured by Sanyo Electric Co. Ltd. Of Japan is used to produce bacterially active chlorine gas $Cl_2$ from chloride ions. Such generators are described in Japanese patents 5269469 A, 2190994 A, 2031886 A and 61283391 A, which patents are incorporated herein by reference thereto. As is understood, such generators include a pair of electrodes for creating an electrolytic reaction wherein a relatively biologically inactive chloride ion, present in municipal tap water, is converted to the more biologically active growth retarding or inhibiting chlorine gas. In the present invention, the pair of electrodes are positioned in the water receiving tank of the ice maker. In operation, a potential is periodically applied between the electrodes for predetermined periods of time to produce the active chlorine to a desired level. It was found that by enriching the $Cl_2$ content of the water, growth of microorganisms on the evaporator, the receiving tank, the distribution tube and the tubing associated there with was greatly reduced or eliminated.

DESCRIPTION OF THE DRAWINGS

A further understanding of the structure, function, operation, and objects and advantages of the present invention can be had by referring to the following detailed description that refers to the following figures, wherein:

FIG. 1 shows a schematic diagram of the present invention.

FIG. 3 shows an enlarged perspective view of a receiving tank, ice forming grid/evaporator and water distribution tube.

DETAILED DESCRIPTION OF THE PREFERRED EMBODIMENT

Figure 3:
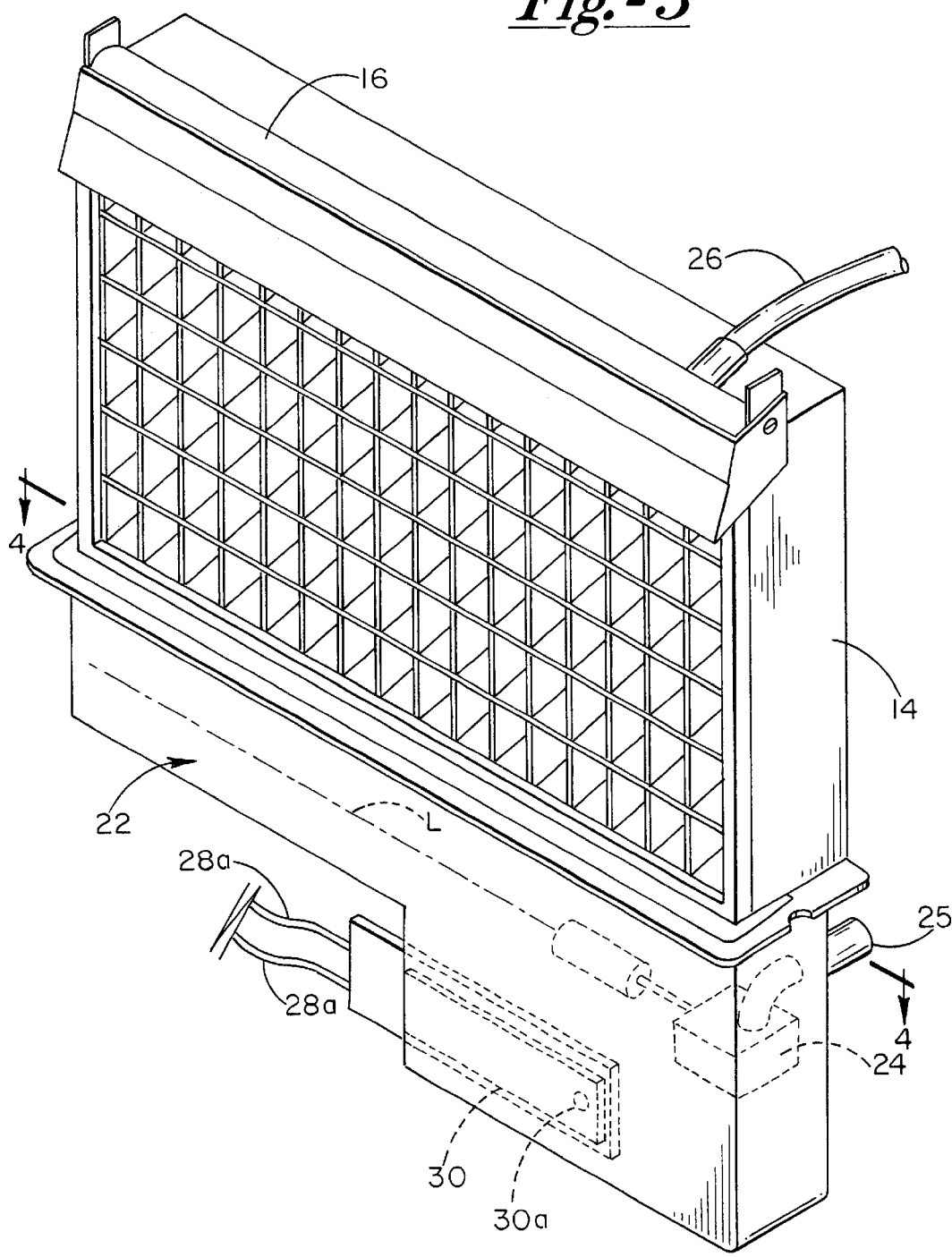
FIG. 3 shows a front plan schematic view of an ice maker.
Figure 4:
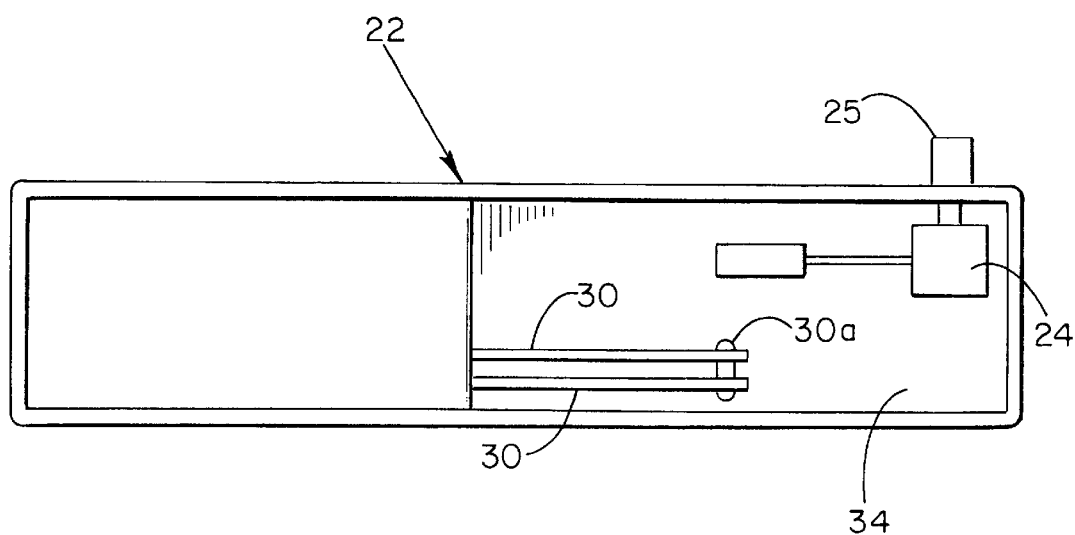
FIG. 4 shows top plan view along lines 4—4 of FIG. 3.

A schematic view of the modified ice maker sanitizing system of the present invention is seen in FIG. 1 and generally referred to by the numeral 10. As can be understood by also referring to FIG. 2, system 10 is used in the context of an ice maker 12 having an ice forming evaporator 14, a distribution tube 16. Refrigeration system includes a compressor 18a, a condenser and fan motor 18b and 18c respectively. System 10 also includes a water circulating pump 20 and a water receiving tank 22. Tank 22 includes a float valve 24 connected to a line 25 connected to a source of municipal water. Valve 24 regulates the supply of water into tank 22 as is required to replenish that which is formed into ice and that which is periodically dumped there from. A fluid line 26 connects pump 20 to tank 22 and to distribution tube 16. A solenoid S provides for the above mentioned dumping of water in tank 22 to a drain. As is well understood, a refrigeration control 27 controls the operation of ice maker 12 to determine, for example, when ice is of sufficient thickness on evaporator 14 so as to initiate harvest thereof.

As seen by referring to FIG.'s 3 and 4, a chlorine generator, as manufactured by Sanyo Electric co. Ltd. Of Japan, includes a chlorinator control box 28 connected by wires 28a to a pair of flat plate electrodes 30. Electrodes are kept spaced apart by an insulating plug 30a. Ice maker 12 includes a bottom ice retaining bin 31 and a top housing 32. Housing 32 is divided into a separate refrigeration component section 32a and a separate ice making section 32b. Control box 28 is located in refrigeration component section 32a wherein wires 28a provide connection to electrodes 30 positioned to extend horizontally in tank 22 in a sump area 34 thereof. Control 28 is connected to a suitable source of electrical power and is also electrically connected to refrigeration control 27.

In operation, in the ice making mode, water is circulated by pump 20 to exit distribution tube 16 and cascade over evaporator 14. The refrigeration system is simultaneously operated to cool evaporator 14 so that ice forms thereon. Water that does not freeze on evaporator 14 falls into tank 22 to be recirculated therefrom by pump 20 over evaporator 14 until ice of sufficient thickness has formed thereon. Control 27 senses when sufficient ice has formed and causes harvesting thereof by a hot gas defrost process, well understood in the art. After harvesting and prior to the next ice making cycle, a portion of the water in tank 22 is drained therefrom to remove any impurities therein. Valve 24 then opens to maintain the water in tank 22 to a predetermined level L above electrodes 30. After the dumping process, but before the start of a further ice making cycle, control 28 then provides for an electrical potential between electrodes 30 for the formation of chlorine. Specifically, the chemical reactions can be characterized as:

Anode reaction:

$$2Cl^- \rightarrow Cl_2 + 2e$$

$$4OH^- \rightarrow O_2 + 2H_2O + 4e$$

Cathode reaction:

$$2H^+ + 2e \rightarrow H_2$$

As is understood, the $Cl_2$ gas dissolves in water by the reaction:

$$Cl_2 + H_2O \rightarrow HClO + HCl$$

$$HClO \rightarrow H^+ + ClO^-$$

Control 28 operates on a pre-set time basis. In particular, it is set to provide an electrical potential for a predetermined period of time that will produce chlorine at a nominal level of approximately 0.5 parts per million. This level was determined to have a sufficient bacteriostatic effect, yet not be so high that any bad taste was imparted to the ice or that it would be in any way unsafe for consumption. In a particular embodiment of the present invention, the tank 22 has a volume of approximately 2 quarts wherein electrodes 30 are energized for a period of 40 seconds between each ice making cycle. Each ice making cycle lasts approximately 15 minutes. Control 28 also operates during non-ice making times, such as when bin 31 is full and no further ice making is required. In the specific embodiment referred to above, control 28 energizes the electrodes 30 every 4 hours during periods of non ice making. Such chlorine production during non ice making intervals is important to prevent microorganism growth in tank 22, as the water is stagnant therein and tends to warm up. The 0.5 part per million level, though relatively low, was found to be effective in the present invention due to the cold temperature of the circulated ice making water. The temperature of the circulated water was found to keep the chlorine in solution rather than being lost to evaporation. Thus, the chlorine is kept in the water to provide for a bacteriostatic effect rather than being lost to the atmosphere. Hence, a lower nominal level can be effective as opposed to a situation where the water would be of a warmer temperature.

What is claimed is:

1. A sanitizing system for an ice maker, comprising:

an electronic chlorine generator having a pair of electrodes positioned within a water receiving tank, the water receiving tank positioned below an ice making evaporator wherein ice is formed on the evaporator by a recirculating flow of water there over during cooling thereof whereby water not frozen on the evaporator flows into the water receiving tank to be recycled there over until ice of a sufficient thickness is formed on the evaporator, and the chlorine generator periodically providing a potential to the electrodes for producing chlorine in the water residing in the water receiving tank.

2. A method of sanitizing water used in an ice maker to produce ice, the steps comprising:

flowing water over an ice forming evaporator while cooling the evaporator, catching unfrozen water that flows off the evaporator in a water receiving tank, recirculating water from the water receiving tank over the evaporator until ice of a sufficient thickness forms thereon, periodically producing chlorine gas in the water in the water receiving tank by an electrolysis reaction that forms the chlorine gas from chloride ions present in the water.

* * * * *